(12) United States Patent
Di Giovanni

(10) Patent No.: US 9,998,583 B2
(45) Date of Patent: Jun. 12, 2018

(54) UNDERLYING MESSAGE METHOD AND SYSTEM

(71) Applicant: SUMMIT-TECH MULTIMEDIA COMMUNICATIONS INC., Montrèal (CA)

(72) Inventor: Alido Di Giovanni, Laval (CA)

( * ) Notice: Subject to any disclaimer, the term of this patent is extended or adjusted under 35 U.S.C. 154(b) by 0 days. days.

(21) Appl. No.: 14/770,138

(22) PCT Filed: Feb. 25, 2014

(86) PCT No.: PCT/CA2014/000144
§ 371 (c)(1),
(2) Date: Aug. 25, 2015

(87) PCT Pub. No.: WO2014/127465
PCT Pub. Date: Aug. 28, 2014

(65) Prior Publication Data
US 2016/0006857 A1    Jan. 7, 2016

Related U.S. Application Data

(60) Provisional application No. 61/769,169, filed on Feb. 25, 2013.

(51) Int. Cl.
| | | |
|---|---|---|
| H04M 1/725 | (2006.01) | |
| G06F 3/0481 | (2013.01) | |
| G06F 3/0484 | (2013.01) | |
| G06F 3/14 | (2006.01) | |
| H04W 4/00 | (2018.01) | |

(52) U.S. Cl.
CPC ...... *H04M 1/72547* (2013.01); *G06F 3/0481* (2013.01); *G06F 3/0484* (2013.01); *G06F 3/04817* (2013.01); *G06F 3/14* (2013.01); *G06F 2203/04801* (2013.01); *G06F 2203/04803* (2013.01); *H04W 4/005* (2013.01)

(58) Field of Classification Search
CPC . H04W 4/005; H04M 1/72547; G06F 3/0481; G06F 3/0484; G06F 2203/04801
USPC ...................................... 455/412.2
See application file for complete search history.

(56) References Cited

U.S. PATENT DOCUMENTS

| | | | | |
|---|---|---|---|---|
| 5,581,686 A | * | 12/1996 | Koppolu | G06F 3/0481 715/209 |
| 2004/0128353 A1 | * | 7/2004 | Goodman | H04L 12/581 709/204 |
| 2004/0186889 A1 | * | 9/2004 | Washburn | G06Q 30/0218 709/206 |
| 2004/0239482 A1 | * | 12/2004 | Fitzgibbon | G08C 17/00 340/5.61 |
| 2005/0138002 A1 | * | 6/2005 | Giacobbe | G06F 17/30067 |
| 2005/0268237 A1 | * | 12/2005 | Crane | G06F 3/0481 715/732 |
| 2007/0106739 A1 | * | 5/2007 | Clark | H04L 12/587 709/206 |

(Continued)

*Primary Examiner* — William Nealon
(74) *Attorney, Agent, or Firm* — Praxis

(57) ABSTRACT

An underlying message for interacting with a user of a communication device, the underlying message comprising a visual one to be displayed on the communication device and an activity associated with the visual cue. The underlying message is configured to provide the associated activity through the communication device in response to the detection of a predefined user activation interaction with the visual cue.

12 Claims, 4 Drawing Sheets

(56) References Cited

U.S. PATENT DOCUMENTS

2013/0057695 A1* 3/2013 Huisking ............... H04N 7/186
                                                    348/156
2014/0019790 A1* 1/2014 Bhardwaj ........... G06F 11/3062
                                                    713/340

* cited by examiner

UNDERLYING MESSAGE METHOD AND SYSTEM

CROSS-REFERENCE TO RELATED APPLICATIONS

This application claims the benefits of U.S. provisional patent application No. 61/769,169 filed on Feb. 25, 2013, which is herein incorporated by reference.

TECHNICAL FIELD

The present disclosure relates to an underlying message method and system.

BACKGROUND

With the proliferation of communication networks, communication devices are becoming common place, as well as more and more advanced. Current communication devices are capable of sending and receiving diverse types of data and interact in various ways through a multitude of applications or interfaces.

However, there is a need for a means allowing users to communicate and interact in various ways via a common interface.

SUMMARY

There is provided an underlying message for interacting with a user of a communication device, the underlying message comprising:
  a visual cue to be displayed on the communication device; and
  an activity associated with the visual cue;
wherein the underlying message is configured to provide the associated activity through the communication device in response to the detection of a predefined user activation interaction with the visual cue.

There is also provided an underlying message as above wherein the visual cue includes:
  a text portion for displaying information about the associated activity; and
  an indicator portion indicating the presence of the associated activity.

There is further provided an underlying message as above wherein the associated activity includes processor executable code to be executed by a processor of the communication device or a link to processor executable code on a remote server be executed by a processor of the remote server.

There is still further provided an underlying message as above wherein execution of the associated activity causes a change in behavior of a remote controller.

There is also provided a method for interacting with a user of a communication device using the above described underlying message.

BRIEF DESCRIPTION OF THE FIGURES

Embodiments of the disclosure will be described by way of examples only with reference to the accompanying drawings, in which.

Similar references used in different Figures denote similar components.

DETAILED DESCRIPTION

Generally stated, the non-limitative illustrative embodiments of the present disclosure provide an underlying message method and system. The underlying message consists in a visual cue having an associated activity (e.g. audio, video and/or text content, real-time communication, data submission request, interactive form, etc.), which a user can interact with. The visual cue may simply be a graphically recognizable icon or it may also include some text/indicator of the associated activity or instructions as to how to activate the associated activity (e.g. "Press to activate", "Slide to open", etc.) or a combination thereof.

Figure 1:
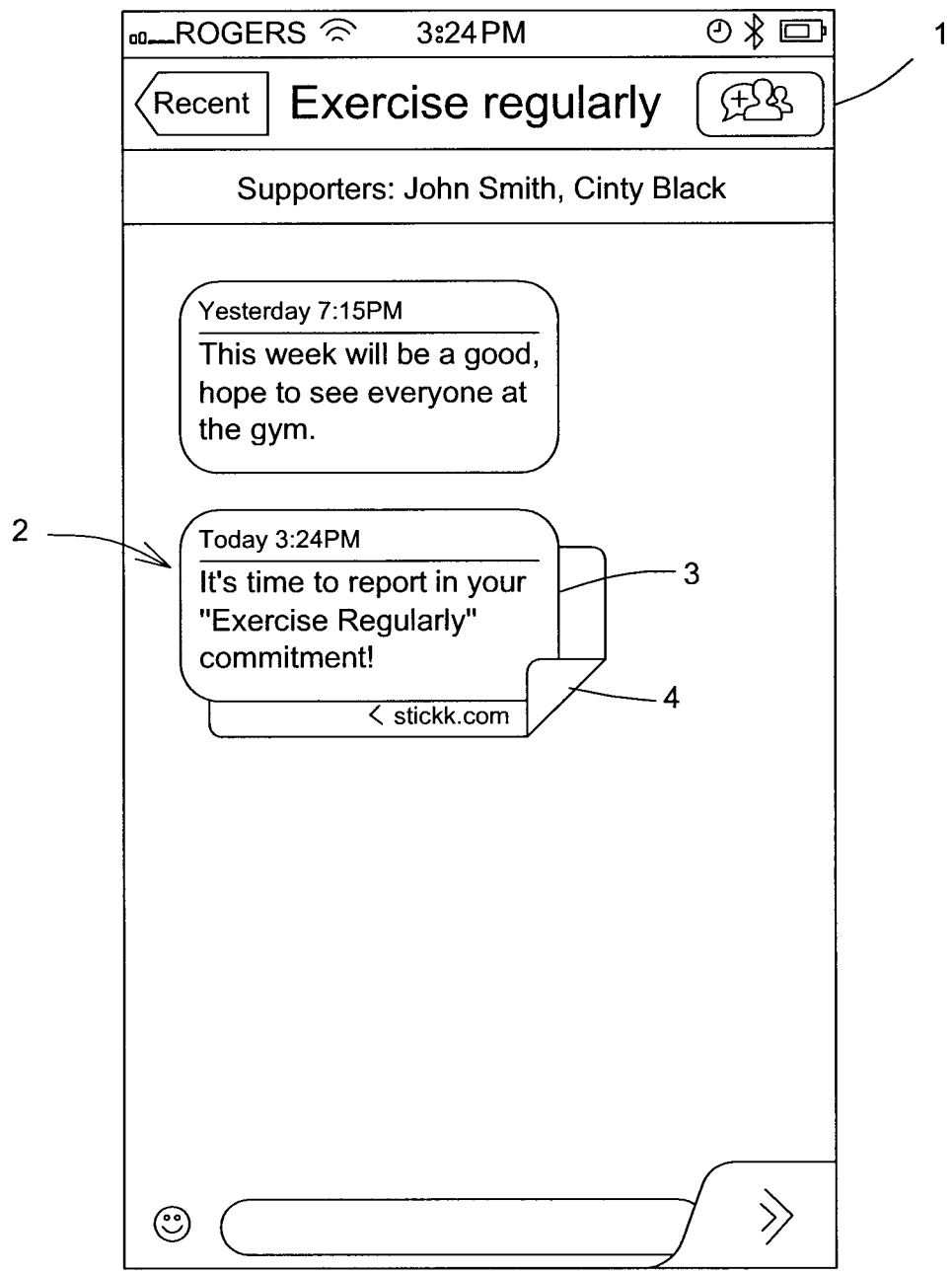
FIG. 1 is an example of an underlying message visual cue in accordance with an illustrative embodiment of the present disclosure.

Referring to FIG. 1, there is shown an example of an underlying message visual cue 2 in accordance with an illustrative embodiment of the present disclosure. The visual cue 2 is displayed on the graphical interface 1 of a receiving communication device such as, for example, a smart phone, tablet PC, personal digital assistant (PDA), laptop or personal computer, etc.

The visual cue 2 generally includes a text portion 3 for displaying information about the subject of the associated activity, its content, its originator and/or instructions as to how to activate the associated activity (e.g. "Press to activate", "Slide to open", etc.), or a combination thereof, and an indicator portion 4 indicating the presence of an associated activity.

In an alternative embodiment the visual cue 2 may simply be a graphically recognizable icon. In another alternative embodiment, physical attributes of the visual cue 2 may vary, for example the text portion 3 and/or the indicator portion 4 may vary in color and/or form according to the type of the associated activity and/or the way in which to activate it and/or its status (e.g. not read, not read, replied to, etc).

Figure 2:
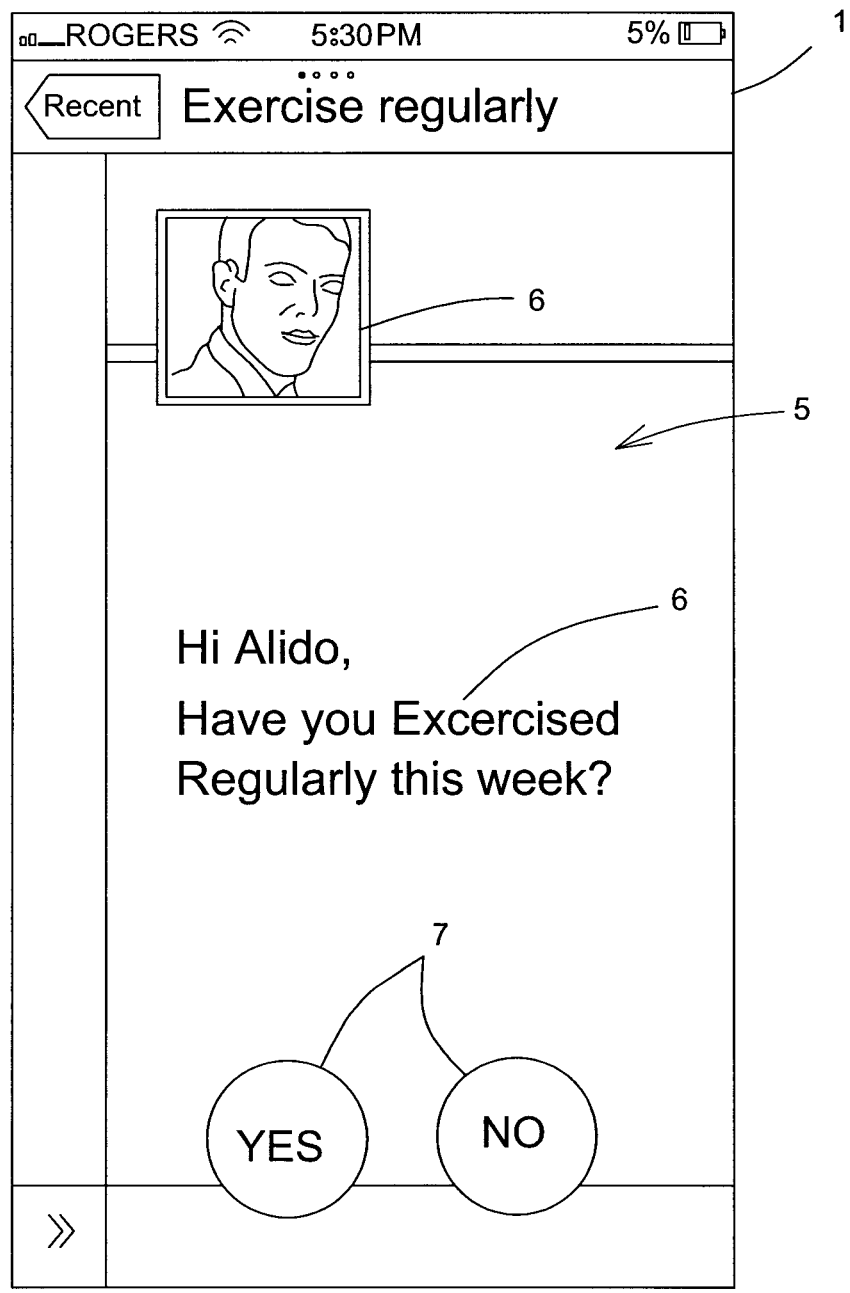
FIG. 2 is an example of an underlying message associated with the visual cue of FIG. 1.

Referring to FIG. 2, there is shown an example of an associated activity 5 associated with the visual cue 2 of FIG. 1 in accordance with an illustrative embodiment of the present disclosure. The associated activity 5, which is activated from the visual cue 2 and displayed on the graphical Interface 1 of the receiving communication device, generally includes audio, video and/or text content, real-time communication, data submission request, interactive form, etc., which a user can access or interact with. In the illustrated example the associated activity 5 includes image and text 6 as well as an interactive form 7.

Figure 3:
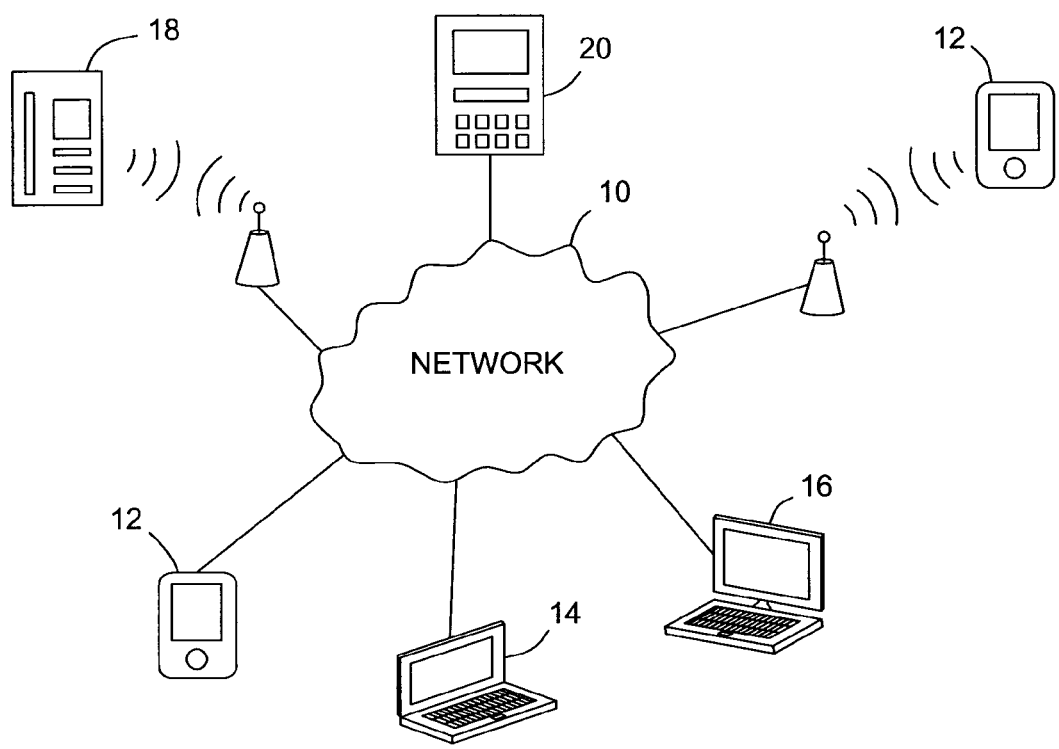
FIG. 3 is a schematic representation of an underlying message system in accordance with an illustrative embodiment of the present disclosure.

Referring now to FIG. 3, there is shown a schematic representation of an underlying message system in accordance with an illustrative embodiment of the present disclosure. The underlying message system generally takes the form of various communication devices such as, for example, smart phones, tablet PCs or personal digital assistant (PDA) 12, laptop 14 or personal 16 computers, etc., and, optionally, sensors/controllers 18 and/or servers 20, operatively interconnected through a network 10 such as, for example, Ethernet (broadband, high-speed), wireless WiFi, cable internet, satellite connection, cellular or satellite network, etc., or a combination thereof.

The various communication devices 12, 14, 16 may communicate underlying messages directly between each other using processor executable code, stored an a data storage medium thereon, configured to cause the processor of each communication device 12, 14, 16 to generate/transmit and receive/activate underlying messages.

In an alternative embodiment, the various communication devices 12, 14, 16 may communicate underlying messages through a server 20.

The communication devices 12, 14, 16 may communicate underlying messages using various addressing means known in the art as well as through a proxy scheme or addressing table on the server 20.

In another alternative embodiment, sensors/controllers 18 may communicate underlying messages directly to communication devices 12, 14, 16, or through a server 20, using processor executable code, stored on a data storage medium thereon, configured to cause the processor of the sensors/controllers 18 to generate/transmit and receive/activate underlying messages. The sensors/controllers 18 may communicate underlying messages directly to communication devices 12, 14, 16 in a machine-to-machine (M2M) configuration, the activity 5 (see FIG. 2) relating some status, alarm or information regarding a specific sensor/controller 15 and providing an interactive for 7 (see FIG. 2), or other interactive interface, allowing a user to cause the sensor/controller 18 to behave in a desired way in response to the communicated status, alarm or information.

Depending on the configuration of the underlying message system, the associated activity 5 (see FIG. 2) may be uploaded/executed locally on the receiving communication device 12, 14, 16 or displayed/executed remotely from the server 20 (i.e. if present). Optionally, underlying message activities 5 may also be stored on the server 20 if present.

Figure 4:
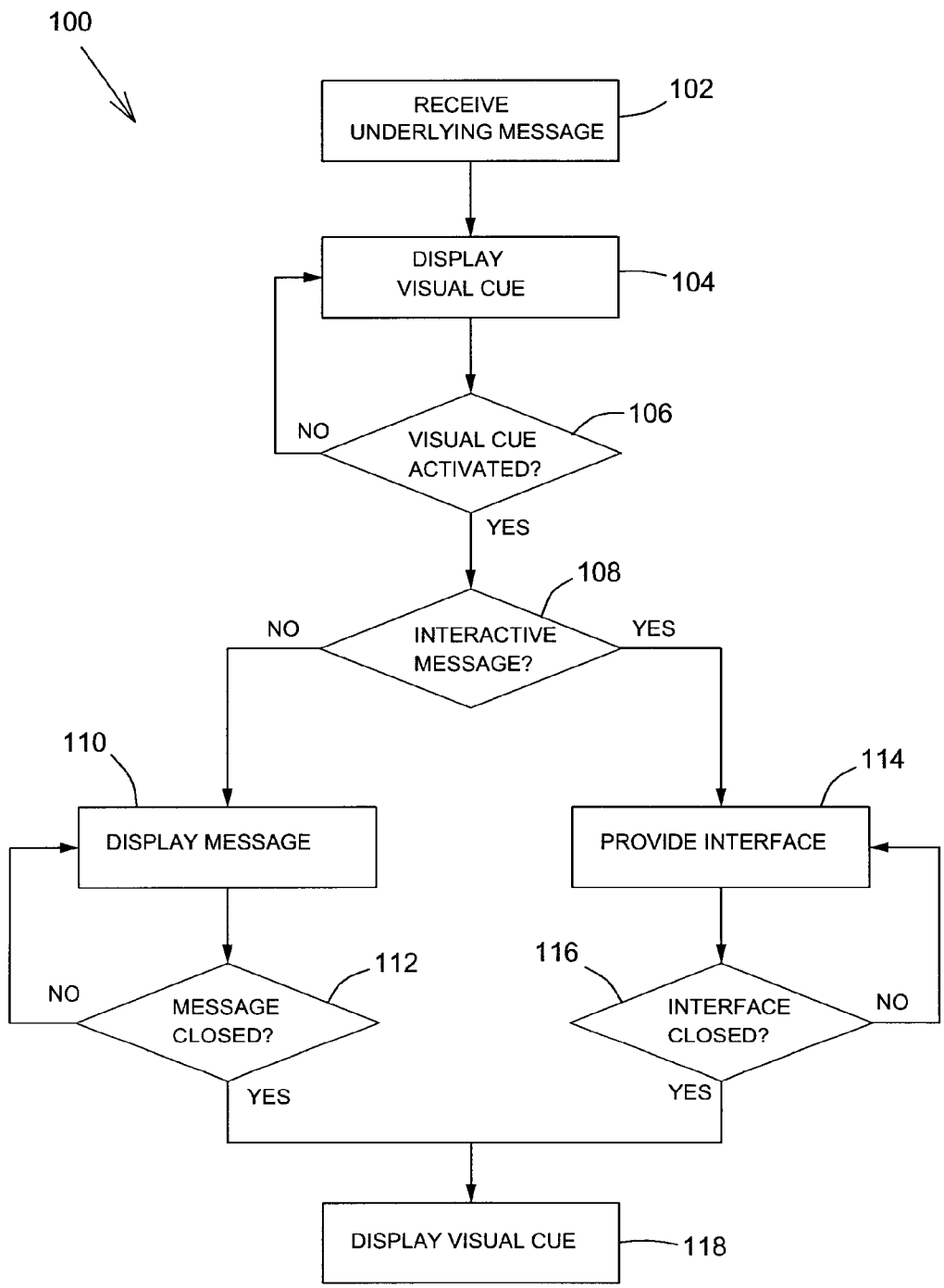
FIG. 4 is a flow diagram of an underlying message process in accordance with an illustrative embodiment of the present disclosure.

Referring to FIG. 4, there is shown a flow diagram of the underlying message process in accordance with an illustrative embodiment of the present disclosure. Steps of the process 100 are indicated by blocks 102 to 118.

The process 100 starts at block 102 where an underlying message is received on a communication device 12, 14, 16.

Then, at block 104, the visual cue 2 is displayed on the graphical interface 1 of the receiving communication device 12, 14, 16.

At block 106, the process 100 verifies if the activity 5 has been activated, if so it proceeds to 108, if not, it proceeds back to block 104.

At block 108, the process 100 verifies if the activity 5 has is interactive, if so it proceeds to 114, if not, it proceeds to block 110.

At block 110, the process 100 displays the content of the activity 5 (i.e. text, audio, video, etc. or a combination thereof) on the graphical interface 1 of the receiving communication device 12, 14, 16.

The process 100 then verifies, at block 112, if the used has closed the activity 5, if so it proceeds to 118, if not, it proceeds back to block 110.

At block 114, the process 100 displays the content of the activity 5 (i.e. real-time communication, data submission request, interactive form, etc.) using an interactive interface on the graphical interface 1 of the receiving communication device 12, 14, 16.

The process 100 then verifies, at block 116, if the used has closed the interface of the activity 5 (or submitted requested data, an associated form, etc.), if so it proceeds to 118, if not, it proceeds back to block 114.

Finally, at block 118, the visual cue 2 is displayed on the graphical Interface 1 of the receiving communication device 12, 14, 16.

Although the present disclosure has been described with a certain degree of particularity and by way of an illustrative embodiments and examples thereof, it is to be understood that the present disclosure is not limited to the features of the embodiments described and illustrated herein, but includes all variations and modifications within the scope and spirit of the disclosure as hereinafter claimed.

What is claimed is:

1. A method for interacting with a user of a communication device having a graphical interface, the method comprising:
   providing a remote controller including a processor and processor executable code stored on a data storage medium, which code when executed causes the processor to generate and transmit a message to the communication device, the message consisting of:
   a visible first part in the form of a visual cue to be displayed on the graphical interface of the communication device, the visual cue including a text portion and an indicator portion; and
   a hidden second part in the form of an activity associated with the visual cue;
   wherein the text portion displays information about the associated activity and the indicator portion indicates the presence of the associated activity, the message being configured to provide the associated activity through the graphical interface of the communication device in response to the detection of a predefined user activation interaction with the visual cue and the execution of the associated activity causing a change in behavior of the remote controller.

2. The method of claim 1, wherein the processor transmits the message directly to the communication device.

3. The method of claim 1, wherein the processor transmits the message to the communication device through a server.

4. The method of claim 1, wherein the visual cue relates at least one of a status of the controller, an alarm of the controller and information regarding the controller.

5. The method of claim 4, wherein the activity associated with the visual cue provides an interactive interface allowing the user to cause the controller to behave in a desired way in response to the status of the controller, the alarm of the controller or the information regarding the controller.

6. The method of claim 1, wherein the predefined user activation interaction with the visual cue consist of a sliding motion.

7. A method for interacting with a user of a communication device having a graphical interface, the method comprising:
   providing a remote sensor including a processor and processor executable code stored on a data storage medium, which code when executed causes the processor to generate and transmit a message to the communication device, the message consisting of:
   a visible first part in the form of a visual cue to be displayed on the graphical interface of the communication device, the visual cue including a text portion and an indicator portion; and
   a hidden second part in the form of an activity associated with the visual cue;
   wherein the text portion displays information about the associated activity and the indicator portion indicates the presence of the associated activity, the message being configured to provide the associated activity through the graphical interface of the communication device in response to the detection of a predefined user activation interaction with the visual cue and the execution of the associated activity causing a change in behavior of the remote sensor.

8. The method of claim 7, wherein the processor transmits the message directly to the communication device.

9. The method of claim 7, wherein the processor transmits the message to the communication device through a server.

10. The method of claim 7, wherein the visual cue relates at least one of a status of the sensor, an alarm of the sensor and information regarding the sensor.

11. The method of claim 10, wherein the activity associated with the visual cue provides an interactive interface allowing the user to cause the sensor to behave in a desired way in response to the status of the sensor, the alarm of the sensor or the information regarding the sensor.

12. The method of claim 7, wherein the predefined user activation interaction with the visual cue consist of a sliding motion.

\* \* \* \* \*